Sept. 15, 1953 R. RUBINSTEIN 2,651,890

AUTOMATIC EDGE GRINDING MACHINE FOR LENSES

Filed Dec. 11, 1951 10 Sheets-Sheet 1

INVENTOR.
ROBERT RUBINSTEIN
BY
Zoltan H. Polachek
ATTORNEY

AUTOMATIC EDGE GRINDING MACHINE FOR LENSES

Filed Dec. 11, 1951 10 Sheets-Sheet 2

INVENTOR.
ROBERT RUBINSTEIN
BY Zoltan P. Holocheck
ATTORNEY

INVENTOR.
ROBERT RUBINSTEIN
BY Zoltan H. Polachek
ATTORNEY

Sept. 15, 1953 R. RUBINSTEIN 2,651,890

AUTOMATIC EDGE GRINDING MACHINE FOR LENSES

Filed Dec. 11, 1951 10 Sheets-Sheet 4

INVENTOR
ROBERT RUBINSTEIN
BY
ATTORNEY

INVENTOR.
ROBERT RUBINSTEIN
BY Zoltan Holachek
ATTORNEY

AUTOMATIC EDGE GRINDING MACHINE FOR LENSES

Filed Dec. 11, 1951

INVENTOR.
ROBERT RUBINSTEIN
BY Zoltan Polachek
ATTORNEY

Sept. 15, 1953 R. RUBINSTEIN 2,651,890

AUTOMATIC EDGE GRINDING MACHINE FOR LENSES

Filed Dec. 11, 1951 10 Sheets-Sheet 7

INVENTOR.
ROBERT RUBINSTEIN
BY Zoltan Polachek
ATTORNEY

INVENTOR.
ROBERT RUBINSTEIN
BY Zoltan Polachek
ATTORNEY

INVENTOR.
ROBERT RUBINSTEIN
BY Zoltan Polachek
ATTORNEY

INVENTOR.
ROBERT RUBINSTEIN
BY
Zoltan Holachek
ATTORNEY

Patented Sept. 15, 1953

2,651,890

UNITED STATES PATENT OFFICE 2,651,890

AUTOMATIC EDGE GRINDING MACHINE FOR LENSES

Robert Rubinstein, Brooklyn, N. Y.

Application December 11, 1951, Serial No. 261,079

18 Claims. (Cl. 51—101)

This invention relates to new and useful improvements in a lens edge beveling machine.

More specifically, the present invention proposes certain improvements in existing lens edge beveling machines for making them more effective for grinding spectacle and similar lenses to have a more perfect fit in the frames regardless of the shape of the lens of the number of straight edges commonly found on fancy shaped lenses.

In grinding lenses in the existing lens edge beveling machines, it has been found that they produce edges which are unevenly spaced from the front surface of the lens, particularly on fancy shaped lenses which have one or more straight edges. On the straight edges of such fancy lenses, the machines have a tendency to grind a heavier bevel on the front surface of the lens and, if such lens is mounted in a plastic or metallic frame, the lens appears to protrude from the front of the frame particularly along the straight edges. To overcome that objectionable feature, a skilled operator must touch up the lens by grinding by hand with the result that time is lost in the operation and the size of the lens is made smaller.

In the construction of such existing lens edge beveling machines it is common practice to employ a rotary grinding wheel with opposed grinding faces and a lens holder for supporting a lens to be ground in a position engaged with one of the grinding surfaces of the grinding wheel with the result that the heavier bevel is produced on the front face of fancy lenses having one or more straight edges, therefore it is proposed to pivotally support the lens holder to pivot on an axis at right angles to the axis of rotation of the lens holder and to provide means for pivoting the lens holder to cause the usually heavier bevel to be formed on the back face of the lens at the straight edges in a manner so that when the lens is mounted in a frame the heavier bevel will protrude at the rear of the frame where it will be less noticed when the spectacles are worn.

Lenses which are thick in the center will necessarily have a heavier bevel along any straight edges and especially at points midway of the lengths of such straight edges, because at those points the bevel is nearest the thicker center of the lenses. The increased thickness of the bevel becomes more apparent as the lens has to be ground to smaller sizes. Other types of lenses which show an unusually uneven bevel are cylindrical lenses. A cylinder on a lens is a bulge of glass along a given meridian and the stronger the cylindrical prescription the heavier the glass will be at the prescribed meridian. The present invention proposes means for automatically controlling the positioning of the bevel and the amount of such bevel so that no objectionable bevel is shown when the lens is inserted in a frame. The use of present day bevelers requires an extra hand grinding process in order to overcome objectionable bevels.

Another object of the invention proposes constructing the means for pivoting the lens holder so that it may be manually adjusted prior to the start of the grinding operation to thereafter be fully automatic in its operation for lenses of any desired shape and regardless of the number of straight edges about the periphery of the lens.

Still further, the present invention proposes providing a novel means for rotating the lens holder in steps as areas of the periphery of the lens supported in the holder are completely ground in accordance with the shape of a former supported by the lens holder in a manner to reduce the number of revolutions which the lens holder must make in order to completely grind the lens.

As a further object, the present invention proposes providing the machine with a manually operable control which can be set at the start of the grinding operation for varying the number of revolutions of the lens holder after which the machine will be completely stopped at the end of the lens grinding operation.

The present invention further proposes providing the machine with a test release device arranged to free the lens holder for rotation by hand in a manner so that the operator may quickly and easily determine if a precut lens is properly centered in the lens holder to touch evenly on the grinding stone all about its periphery.

A still further object of the invention proposes the provision of a switch which can be manually turned on to energize the mechanism for operating the lens holder to rotate the same and which can be employed for patternless beveling to reduce the size of a finished lens when it has been found that the lens has been ground slightly oversize. That same means can be used to grind round or semi-round lenses which are cut one-half millimeter above the finished size and require just a smoothing bevel. Such a smoothing bevel can be obtained by allowing the lens to revolve one, two or three times depending on the thickness of the glass.

The machine of the present invention is further characterized by the fact that it is completely electrically operated so as to be fully automatic after having been preset to conform its operation to the shape of the particular lens to be ground. Thus, operation of the machine is simple, requiring no special skill on the part of the operator beyond a simple knowledge of how to preset the machine and, therefore, completely eliminates the need for artisans to grind a lens which will fit in the plastic or metallic spectacle frames with no unsightly protrusions at the front of the frames.

It is a further object of the present invention to construct a lens edge beveling machine which is simple and durable, which is effective for its intended purposes and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

On the accompanying drawings forming a material part of the present disclosure:

Figure 1:
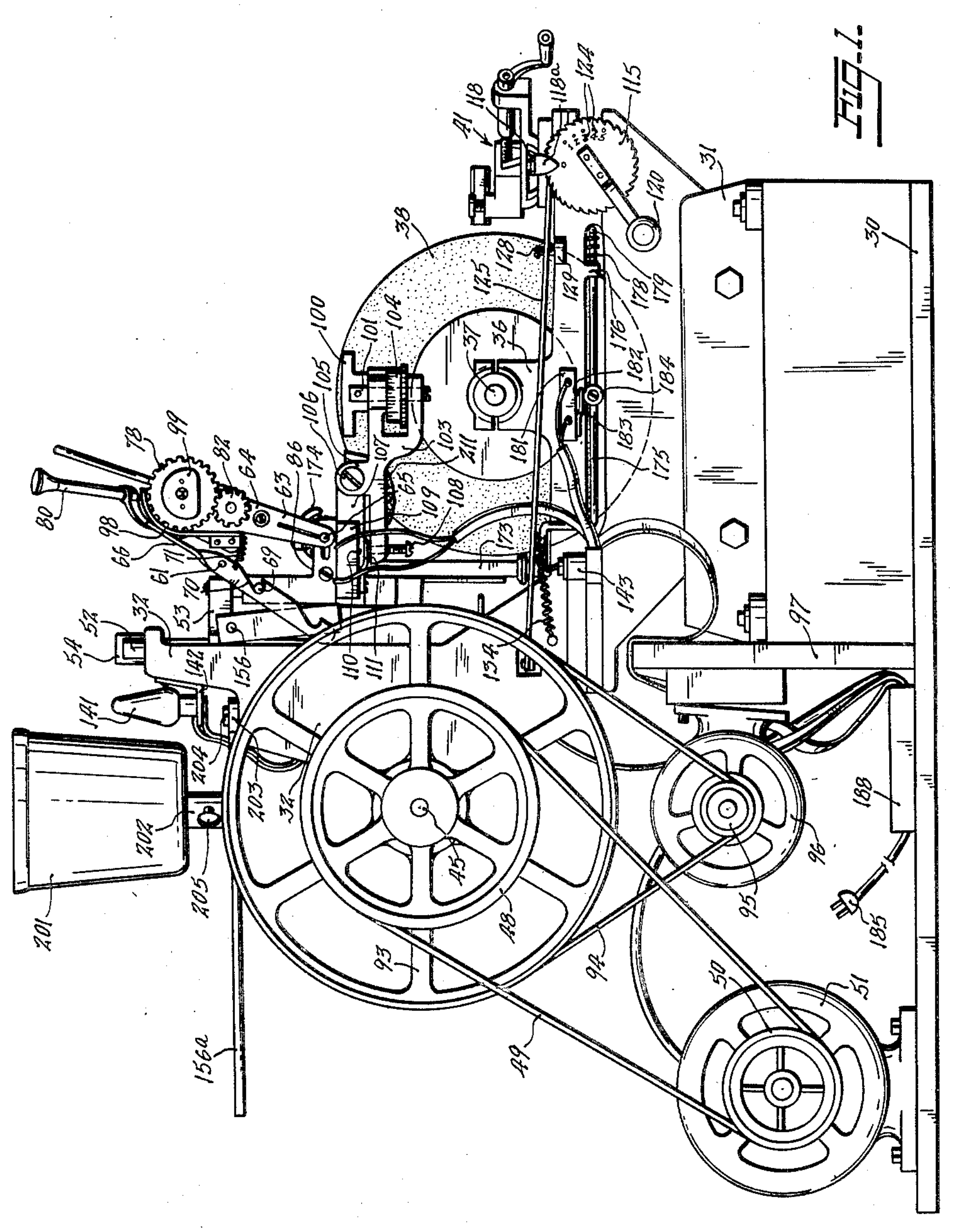
Fig. 1 is a front elevational view of the lens edge beveling machine constructed in accordance with the present invention.

Before proceeding with the description of the constructional details of the present lens edge beveling machine, it is pointed out that the improvements of the present invention can be applied to existing lens edge beveling machines or can be included in the construction of new machines, without departing from the scope and intent of the present invention. On the drawings, the improvements of the present invention are shown applied to such a known machine which is of the type described and illustrated in U. S. Patent No. 1,657,720, granted to Eli M. Long on January 31, 1928, for a "Lens Edging Machine" and reference should be had to that patent for constructional details which are old in the art.

The lens edge beveling machine as constructed in accordance with the present invention, includes a pedestal 30 of wood or the like for mounting the various parts of the machine. Secured in an elevated position at one end of the pedestal 30, there is a base 31 of the actual frame of the machine. Extended upward from the base 31, there are a pair of laterally spaced brackets 32 joined at their top ends by cross bars 33 and 34 and adjacent their bottom ends by a cross bar 35. To one side of the brackets 32, the base 31 is formed with a laterally aligned pair of upstanding bearings 36 which rotatively support a cross shaft 37. Fixed to the shaft 37 between the bearings 36, there is a grinding wheel 38. The grinding wheel 38 has a reentrant V-shaped peripheral formation which provides opposed concentric grinding surfaces 39 and 40, see Fig. 3. Mounted on the base 31 on the side of the grinding wheel 38 opposite the brackets 32, there is mechanism 41 for renewing the grinding surfaces 39 and 40 of the grinding wheel 38. Specific details of the renewing mechanism 41 will not be given in this specification as such mechanisms are generally known in the art and form no part of the present invention.

Figures 20, 22:
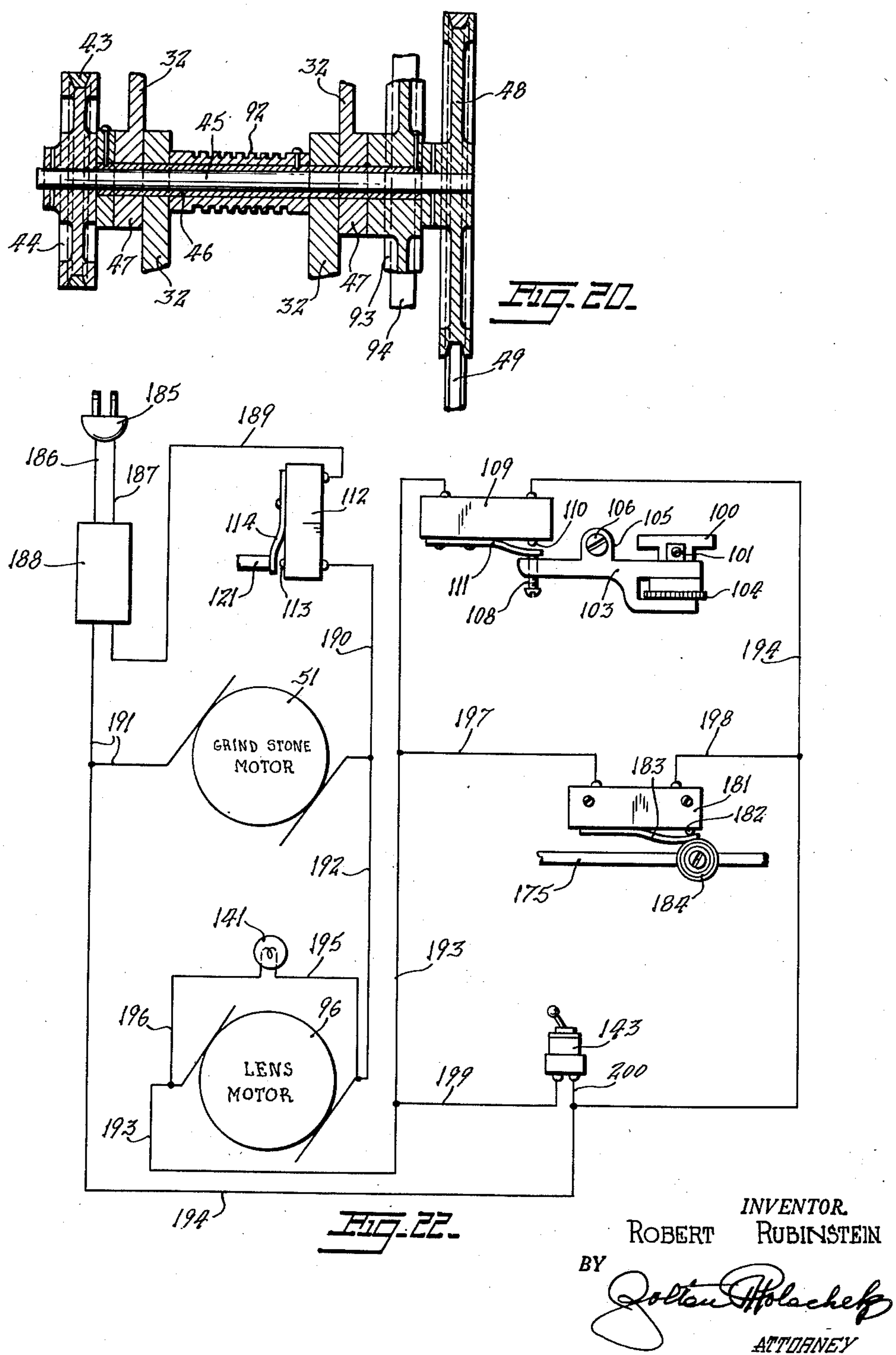
Fig. 20 is an enlarged partial transverse vertical sectional view taken on the line 20—20 of Fig. 2.
Fig. 22 is a schematic wiring diagram of the machine.

One end of the cross shaft 37 which carries the grinding wheel 38 is projected beyond its respective bearing 36 and mounts a pulley 42. A continuous belt 43 is extended about the pulley 42 and has its opposite side engaged over a similar pulley 44. The pulley 44, see particularly Fig. 20, is pinned to one end of a shaft 45 which is freely rotatively extended through an outer tubular shaft 46. The tubular shaft 46 is in turn rotatively supported in bearings 47 formed on the brackets 32. Thus, the tubular shaft 46 is free to rotate relative to the brackets 32 and the shaft 45 is free to rotate relative to the tubular shaft 46.

The end of the shaft 45 remote from the pulley 44 is extended from the end of the tubular shaft 46 and fixed thereto is a large pulley 48 over which a continuous belt 49 is engaged. The other side of the belt 49 is engaged over a pulley 50 carried by the driven shaft of an electric motor 51 mounted on the pedestal 30. Thus, when the electric motor 51 is energized by means to be hereinafter described, the grinding wheel 38 will be continuously rotated through the shaft 45 and independently of any rotation of the tubular shaft 46. The motor 51 is hereinafter referred to as the "grind stone motor."

Figure 3:
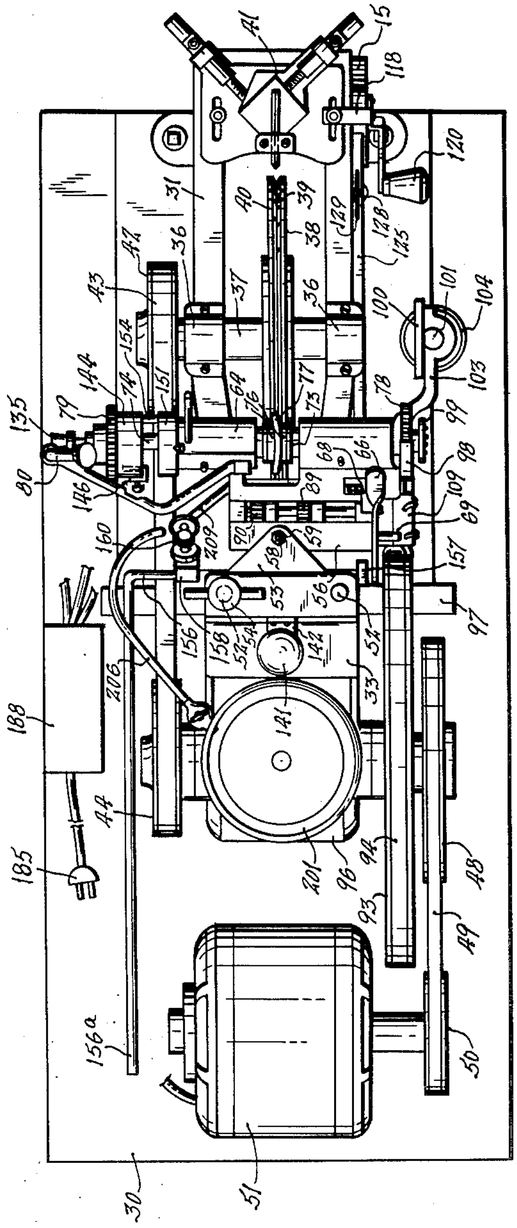
Fig. 3 is a plan view of Fig. 1.
Figure 4:
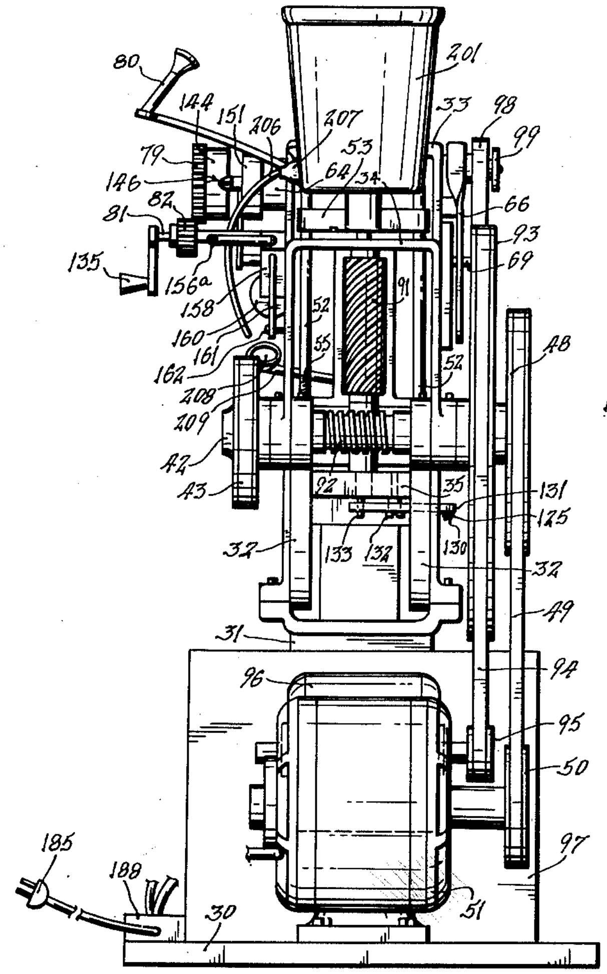
Fig. 4 is an end elevational view looking from the left side of Fig. 1.

Extended vertically between the cross bars 33 and 35 which connect the brackets 32, there is a spaced pair of guide rods 52 upon which a carriage 53 is vertically slidably positioned, see Figs. 3 and 4. The one guide rod 52 is rotatively supported for rotation on its vertical axis and is provided above the top face of the cross bar 33 with a knob 54 by which a grip may be had on that guide rod for turning the same in one direction or the other. The lower portion of that one guide rod 52 is formed with threads 55 which threadedly engage a corresponding part of the carriage 53 for raising and lowering the same as the knob 54 is turned in one direction or the other. Further constructional details of the vertical adjustment of the carriage 53 and its purpose to locate the edge of the lens to be ground with relation to the periphery of the grinding wheel 38 is described in greater detail in the aforementioned Long patent.

The carriage 53 in turn mounts the lens holder which includes a frame section 56 positioned between vertically spaced extensions 57 of the carriage. The frame section 56 is pivoted for movement on a vertical axis by screws 58 which are threaded vertically through the extensions 57 and held in desired adjusted positions by lock nuts 59. The inner ends of the screws 58 have conical portions 60 which extend into complementary conical recesses 61 in the top and bottom faces of the frame section 56 so that the frame section 56 has freedom of pivotal movement on the vertical axis of the screws 58.

Intermediate of its height, the frame section 56 is formed with a pair of spaced horizontally extended arms 62 along the outer sides of which there is extended a pair of arms 63 of a second frame section 64 forming part of the lens holder. Adjacent ends of the arms 62 and 63 of the frame sections 56 and 64 respectively are slightly overlapped and pivotally secured together for pivotal movement on a horizontal axis by end aligned pivot pins 65 passed through the arms. Thus, the frame section 64 can be raised vertically about the pivot pins 65 and relative to the frame section 56.

Figures 15, 21:
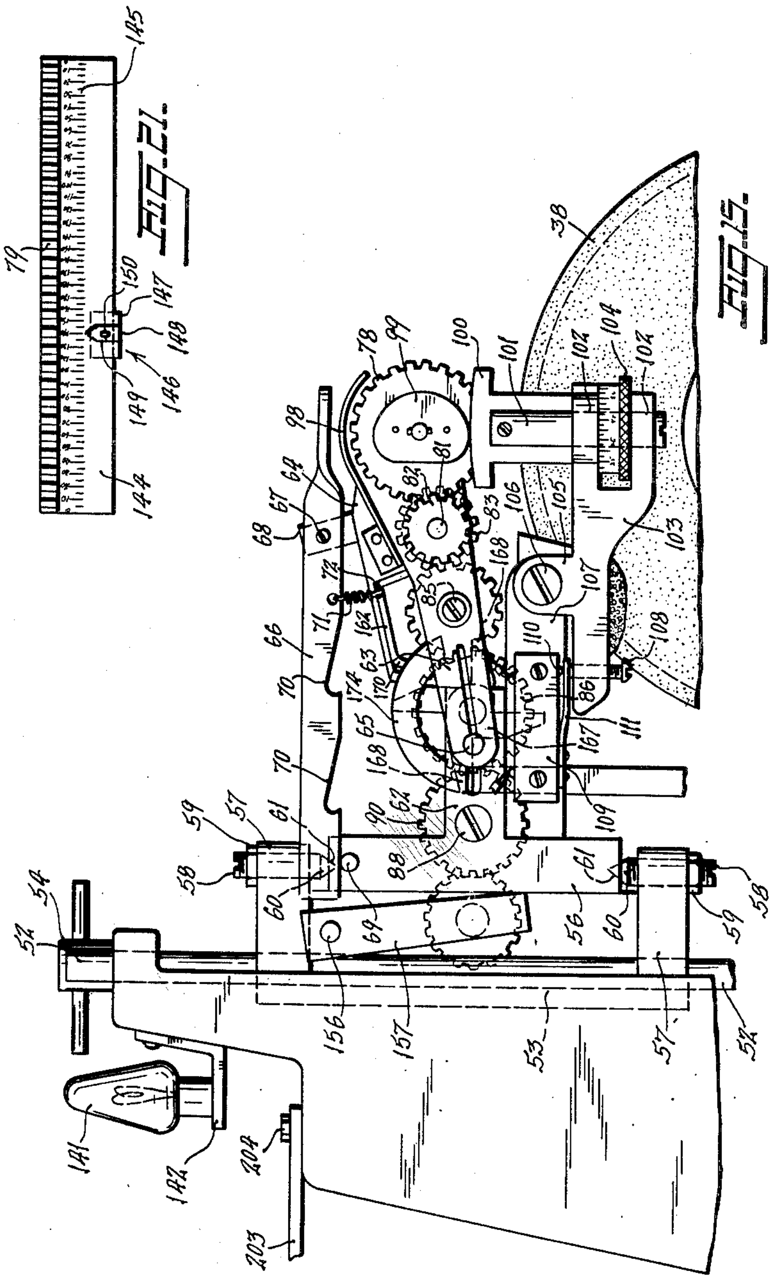
Fig. 15 is an enlarged detailed view of a portion of Fig. 1.
Fig. 21 is a developed view of the control gear of the lens holder pivoting means.

Means is provided for holding the frame section 64 in desired raised positions with relation to the frame section 56. That holding means comprises a lever 66 which is pivotally supported intermediate of its ends by means of a pivot pin 67 to the upstanding arm of an L-shaped bracket 68 mounted on top of the frame section 64. The lever 66 extends longitudinally along the front of the machine to ride on top of a pin 69 which extends from the frame section 56. The bottom edge of the lever 66, see Figs. 1 and 15, is formed with a pair of spaced cutouts 70 for selective engagement with the pin 69 to hold the frame section 64 in the desired elevated position with relation to the frame section 56. A contraction spring 71 has one end connected to the lever 66 and its other end connected to an anchor pin 72 carried by the frame section 64. The end of the lever 66 on the side of the pivot pin 67 opposite the cutouts 70 is vent at right angles to the major portion of the length thereof so that the lever 66 can be pivoted against the action of the spring 71 to disengage the cutouts 70 from the pin 69.

From Figs. 1 and 15 it is clearly apparent that the cutouts 70 are arranged to slide over the pin 69 when the frame section 64 is being raised and to engage the pin 69 and hold the frame section 64 against freedom of pivotal movement in a downward direction. The reason for this arrangement of the cutouts 70 will be explained in greater detail as this specification proceeds.

The end of the frame section 64 remote from the frame section 56 supports a pair of end aligned shafts 73 and 74 which have their adjacent ends spaced. The frame section 64 is formed with a cutout 75 which extends about the spaced inner ends of the shafts 73 and 74. The inner ends of the shafts 73 and 74 are formed with clamp heads 76 for receiving between them the lens blank 77 which is to be ground to a finished lens by engagement with the periphery of the grinding wheel 38. This relationship of the lens holder to the carriage 53 is such that the lens blank 77 is engaged against the grinding surface 39 of the grinding wheel to be beveled at its front face.

The shaft 73 is rotatively mounted in its portion of the frame section 64 and is held against axial sliding movements and is provided at its outer end with a large gear 78. The shaft 74 is rotatively and axially slidably supported in its portion of the frame section and is spring pressed in a direction toward the shaft 73. The outer end of the shaft 74 is formed with a large gear 79. A handle 80 is pivotally mounted on the frame section 64 and is connected to the shaft 74 for sliding the shaft 74 away from the shaft 73 to space the clamp heads 76 to release the lens blank 77 for removal and insertion when required. Constructional details of the mounting of the shafts 73 and 74 and the relationship of the handle 80 to the shaft 74 will not be given in this specification as such details are clearly illustrated in the aforementioned Long patent.

Rotatively and axially slidably mounted on the frame section 64 adjacent the shafts 73 and 74, there is a shaft 81 provided at its ends with gears 82 which mesh with the gears 78 and 79. The gears 78 and 79 and the gears 82 are of the same size so that as the shaft 81 is rotated the shafts 73 and 74 will be rotated in unison at the same rate of speed. Fixedly mounted on the shaft 81 between the arms 63 of the frame section 64, there is a gear 83 which meshes with a gear 84 carried by a shaft 85 rotatively supported between the arms 63 of the frame section 64. The gear 84 in turn meshes with a gear 86 carried by a shaft 87 rotatively supported between the free ends of the arms 62 and the frame section 56. A second shaft 88 is rotatively supported between the arms 62 of the frame section 56 and mounts a gear 89 which meshes with the gear 86. Also mounted on the shaft 88, there is a gear 90 which meshes with a gear, not shown, which in turn carries a worm, not shown, which in turn meshes with a vertically rotating long gear worm 91, see Fig. 4. The gearing between the gear 90 and the gear worm 91 is shown in detail in the aforementioned Long patent. At its lower end, the gear worm 91 carries a worm gear, not shown—see the Long patent—which in turn meshes with a gear worm 92, see Figs. 4 and 20, pinned to the tubular shaft 46.

The tubular shaft 46 projects from one side of the main frame of the machine and carries a large pulley 93 over which a continuous belt 94 is fitted. The other side of the belt 94 passes over a smaller pulley 95 fixed to the driven shaft of an electric motor 96 hereinafter referred to as the "lens motor." Thus, it is apparent that when the lens motor 96 is energized the shafts 73 and 74 and in turn the lens blank 77 will be driven by the intermediate gearing just described.

Figure 2:
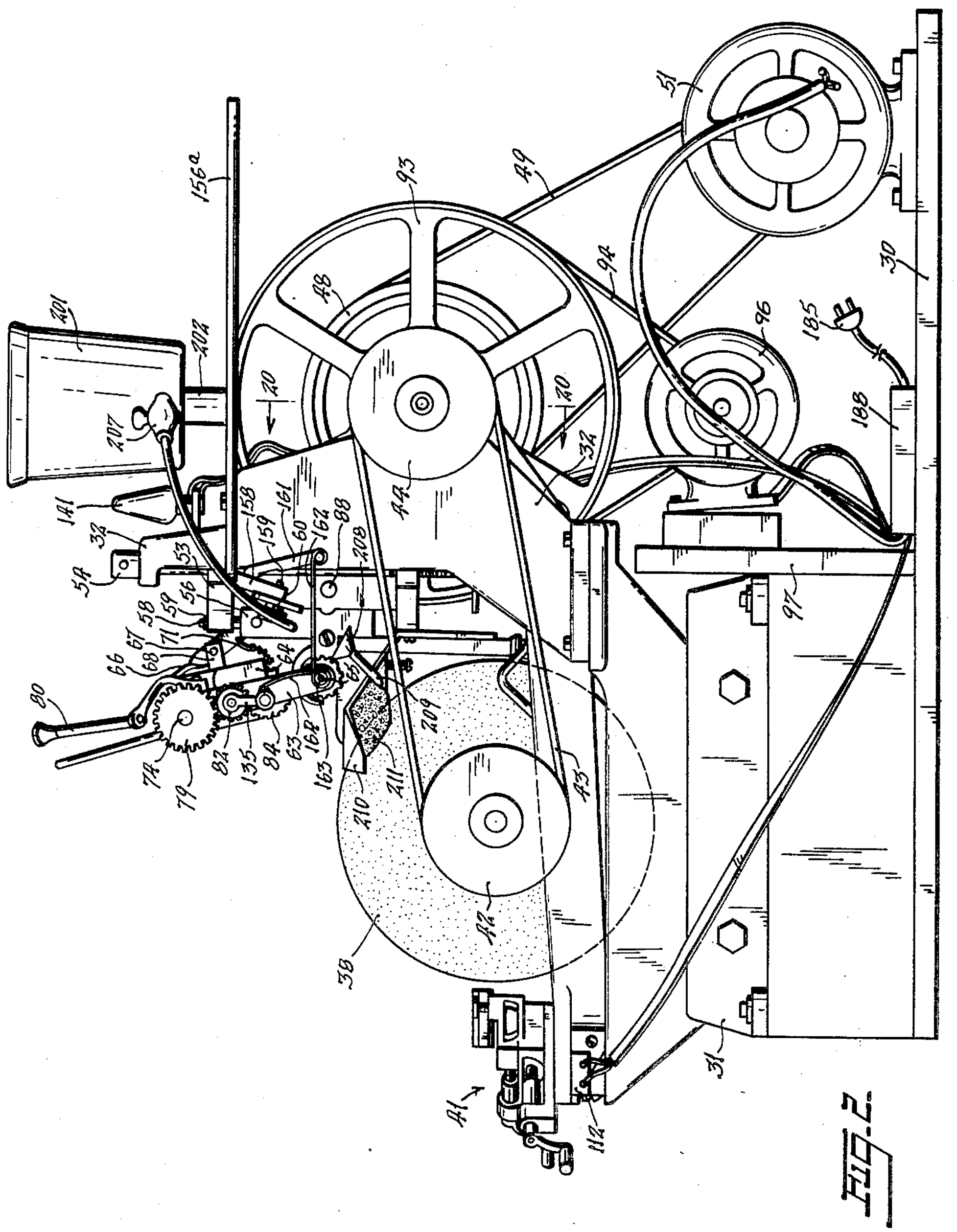
Fig. 2 is a rear elevation view of Fig. 1.

The lens motor 96, as best shown in Figs. 1 and 2, is bolted at its top to the top of a vertical wall 97 extended vertically from the pedestal 30 to have slight downward pivotal movement about the bolts to properly tension the belt 94 to drive the larger pulley 93. The side of the machine facing forward in Fig. 1 is considered to be the front of the machine from which the operator controls operation of the machine. Therefore, the intermeshed gears 78 and 82 are covered over by a guard 98 which protects the operator from accidentally catching his fingers in those gears.

The guard 98 is secured to the side of the frame section 64 by several screws.

Figures 5, 7:
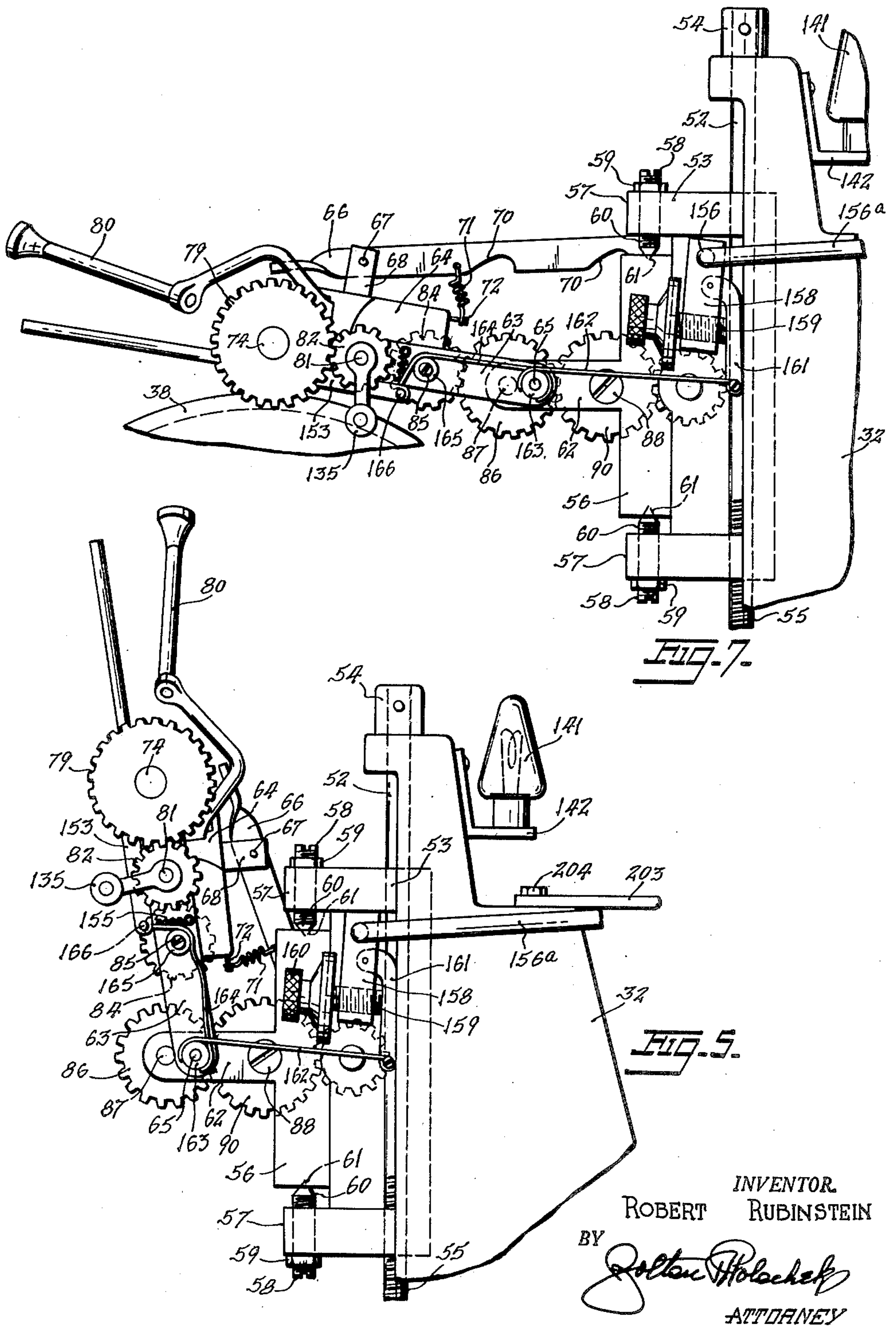
Fig. 5 is an enlarged detailed view of a portion of Fig. 2.
Fig. 7 is a view similar to Fig. 5, but showing a different position of the parts.
Figures 6, 9, 10, 13:
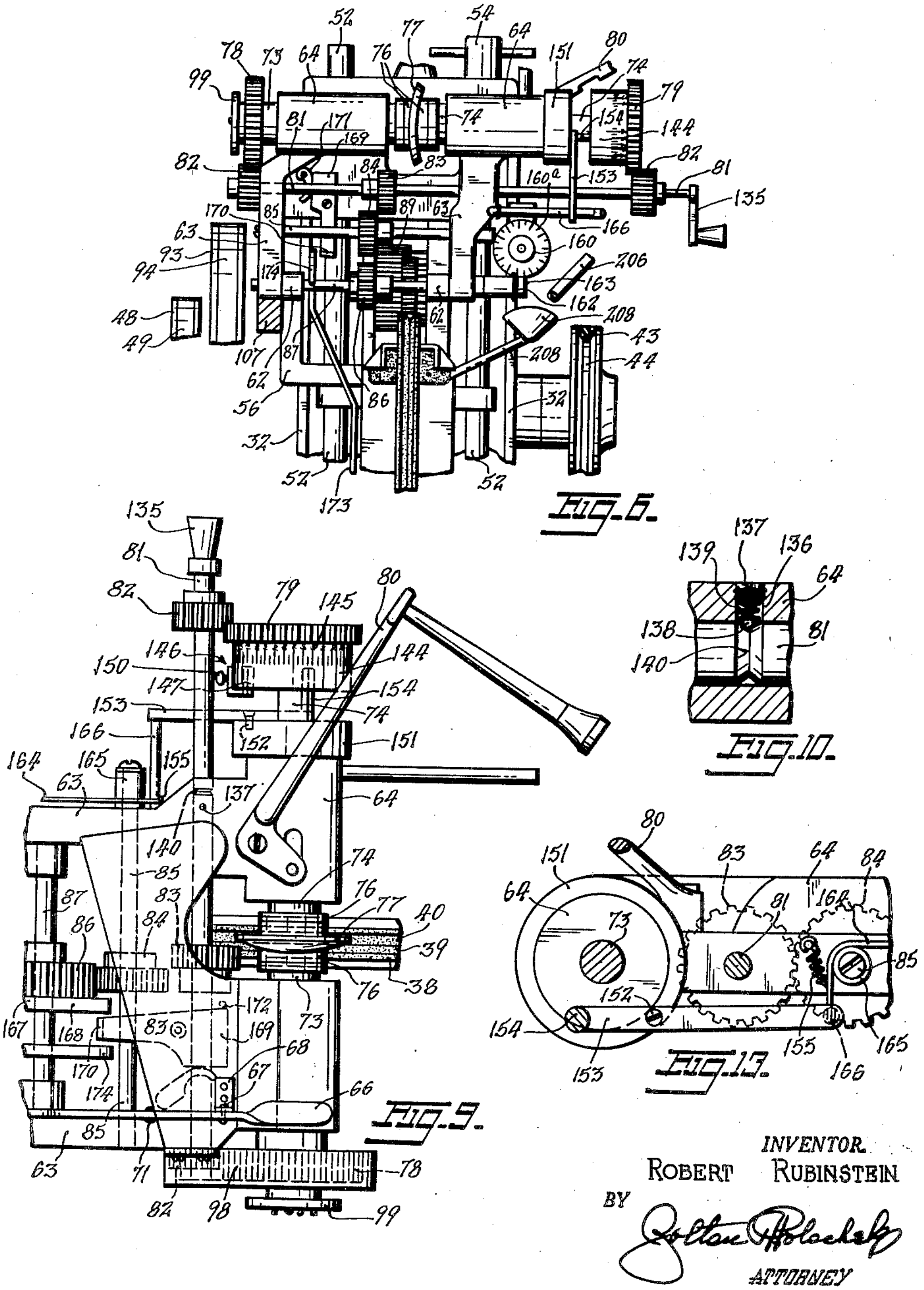
Fig. 6 is a view looking from the left side of Fig. 5.
Fig. 9 is a view similar to a portion of Fig. 8, but showing a different position of the parts.
Fig. 10 is an enlarged partial transverse vertical sectional view taken on the line 10—10 of Fig. 8.
Fig. 13 is an enlarged partial vertical sectional view taken on the line 13—13 of Fig. 8.

When the frame section 64 is moved to its raised position with relation to the frame section 56, as shown in Figs. 1 and 2, the intermeshed gears 84 and 86 will be spaced as shown in Figs. 5 and 6. In such raised position with the gears 84 and 86 spaced, the shafts 73 and 74 and the lens blank 77 will not be rotated even though the lens motor 96 might be energized.

To control the grinding of the lens blank 77 positioned between the clamp heads 76, the end of the shaft 73 where it projects beyond the respective gear 78 is constructed to removably mount a lens pattern 99, best shown in Figs. 1 and 15. The lens pattern 99, in the lowered position of the frame section 64, rests on top of a rest member 100. The rest member 100 is fixedly secured to the top end of a screw 101 which has its lower portion extended slidably down through aligned holes 102 formed in the bifurcated end of a lever 103. Fitted between the tines of the bifurcated end of the lever 103, there is a knurled knob 104 manual rotation of which will cause vertical adjustment of the screw 101 to elevate the rest member 100 so that with the lens pattern 99 resting thereon the lens blank 77 will be in proper peripheral engagement with the grinding wheel 38.

The knob 104 is provided with a scale for permitting careful vertical adjustment of the screw 101 to properly locate the lens blank 77 with relation to the grinding wheel 38.

The lever 103 intermediate of its ends is formed with an upstanding lug 105 through which a screw 106 is pivotally passed. The screw 106 is in turn threaded into an extension 107 of the frame section 56 for pivotally supporting the lever 103. Threaded vertically through the end of the lever 103 on the side of the screw 106 opposite the rest member 100, there is an adjustment screw 108. Secured to the side of the extension 107 above the adjustment screw 108, there is a normally open microswitch 109 provided for controlling energization of the lens driving motor 96 and which has an actuator 110 extending from its bottom face immediately above the adjustment screw 108. Also secured at one end to the bottom face of the switch 109, there is a leaf spring 111 which has a free end interposed between the actuator 110 and the top end of the adjustment screw 108, as best shown in Fig. 15. Wiring of the switch 109 will be hereinafter described; however, it is now pointed out that when the frame section 64 is in the elevated position shown in Fig. 1, lifting the lens pattern 99 off the rest member 100, the leaf spring 111 exerts a sufficient pressure to pivot the lever 103. In that position of the lever 103, the free end of the leaf spring 111 will be spaced from the actuator 110 of the switch 109 so that the switch may assume its normally open position and no current will be flowing to the lens motor 96. However, when the lens pattern 99 is positioned on the rest member 100, as shown in Fig. 15, the lever 103 will be pivoted moving the adjustment screw 108 upward. Upward movement of the screw 108 will cause the leaf spring 111 to be flexed pressing in on the actuator 110 closing the switch 109 to energize the lens motor 96.

In the operation of the machine, the mechanism just described functions to effect a "stop-go" rotation of the lens blank 77. That is so because the lens blank 77 before completion of the grinding operation is of a peripheral size from one to about one and one-half millimeters larger than the desired finished lens. Thus, when the frame section 64 is in its lowered position, the periphery of the lens blank, at its lowered area, will be in contact with the periphery of the grinding wheel 38 before the lens pattern 99 engages the rest member 100. During such time, the grinding wheel 38 will be continuously rotated, while the lens blank 77 remains stationary to grind away that lowered area of the lens blank 77 until the lens pattern 99 rests down on the rest member 100. That will cause the lever 103 to be pivoted to close normally upon microswitch 109 and energize the lens motor 96 to turn the lens blank 77 through a very small portion of a complete revolution. That will move a fresh unground peripheral area of the lens blank into contact with the grinding wheel 38 causing the frame section 64 to be pivoted slightly upward. The lens pattern 99 will again be lifted off the rest member 100 freeing the lever 103 to be pivoted by the action of the leaf spring 111 allowing the switch 109 to assume its normally open position. Energizing of the lens motor 96 will be stopped and the lens blank 77 will be held stationary until that lowermost unground area of the lens blank is ground away when the action will be repeated to align another unground peripheral area of the lens blank 77 with the grinding stone 38. The procedure is continued all about the periphery of the lens blank and it will be appreciated that with this method a considerably less number of revolutions of the lens blank 77 are required to grind the lens blank to the desired size.

The supply of electric current to both of the motors 51 and 96 is controlled by a master normally open microswitch 112 secured to the base 31 below the renewing mechanism 41, see Figs. 2 and 17. The switch 112 has an actuator 113 which extends to the opposite side of the machine and mounts a leaf spring 114 which has a free end normally spaced from the actuator 113 so that the switch 112 may assume its normally open position when the machine is not being used.

Manually pre-settable mechanism is provided for closing the normally open master switch 112 and for controlling the number of revolutions through which the lens blank 77 will be rotated before the machine is again shut off completely by allowing the master switch 112 to assume its normally open position. That manually pre-settable mechanism best illustrated in Figs. 16 to 19, comprises a ratchet wheel 115 which is fixed to the end of a shaft 116. The shaft 116 is rotatively extended into complementary holes 117 in opposite sides of the base 31. Secured in position by one of the screws which mount the renewing mechanism 41 in position there is an L-shaped bracket 118 which has one arm 118a depended along the outer face of the ratchet wheel 115 holding the shaft 116 from being withdrawn from the holes 117 and so rotatively retaining the ratchet wheel 115 in position. The bracket 118 further carries a dog 119 which has its free end resiliently engaged with the teeth of the ratchet wheel 115 limiting rotation of that wheel to the direction indicated by the arrow A on Fig. 16. Secured to the outer face of the ratchet wheel 115 there is a handle 120 by which the ratchet wheel 115 can be turned in the direction of the arrow A.

Figure 19:
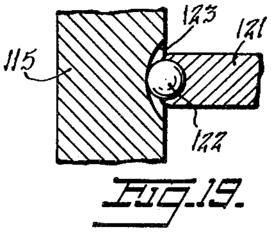
Fig. 19 is an enlarged partial vertical sectional view taken on the line 19—19 of Fig. 18.
Figure 18:
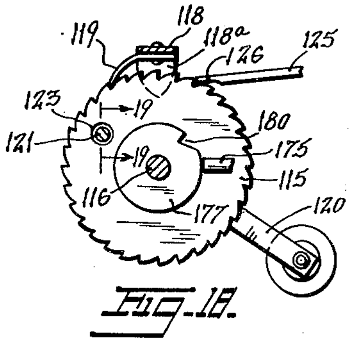
Fig. 18 is a partial vertical sectional view taken on the line 18—18 of Fig. 17.

At a point radially removed from the shaft 116, the base 31 slidably supports an actuator rod 121 in a position extended parallel to the shaft 116. The end of the rod 121 adjacent the ratchet wheel 115, rollably mounts a small ball 122 which rolls against the inner face of the ratchet wheel 115. The other end of the actuator rod 121 bears against the leaf spring 114, see Figs. 17 and 22. At a point in radial alignment with the adjacent end of the actuator rod 121, the inner face of the ratchet wheel 115 is formed with a shallow recess 123 into which the ball 122 fits, as shown in Fig. 19, in only one rotative position of the ratchet wheel 115. When the ratchet wheel 115 is in that one rotative position, the tension of the leaf spring 114 will push axially on the actuator rod 121 urging the ball 122 into the recess 123. In that position, the leaf spring 114 will be spaced from the actuator 113 and the master switch 112 will be in its open position shutting off the supply of all electric current to the machine. In any other rotative position of the ratchet wheel 115, ball 122 will be out of the recess 123 and engaged with the inner face of the wheel 115. That will cause the actuator rod 121 to be moved axially toward the switch 112 flexing the leaf spring 114 to push inward on the actuator 113 and close the normally open switch 112. The switch 112 will be retained closed until the ratchet wheel 115 is turned back to its position in which the recess 123 is aligned with the ball 122. Immediately when the switch 112 is closed, the grinding stone motor 51 will be energized to continuously rotate the grinding stone 38; however, the lens driving motor 86 will not be energized until such time as the normally open switch 109 is closed.

Figure 16:
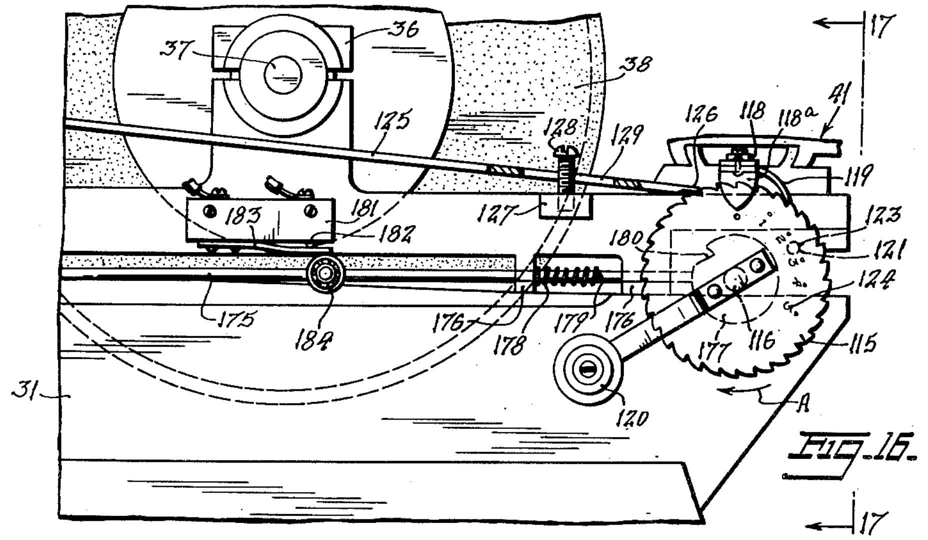
Fig. 16 is an enlarged detailed view of another portion of Fig. 1.

The dependent arm 118ª of the L-shaped bracket 118 also functions as a pointer to register with the numerals 124 inscribed on the front face of the ratchet wheel 115, see Figs. 1 and 16.

The numerals 124 are zero and one to five with the zero denoting the starting position of the ratchet wheel 115 in which the ball 122 is engaged in the recess 123 and the master switch 112 is in its normally open position—the position in which the machine is completely shut off. The numerals from one to five are used to set the machine for the desired number of revolutions of the lens blank 77 to obtain the desired finished lens. From actual test runs of the machine, it has been found that three revolutions of the lens blank 77 are sufficient to obtain the desired fine grinding of the lens blank. Therefore, to start the machine for three revolutions of the lens blank 77, the ratchet wheel 115 would be turned to a position in which the numeral three is aligned with the dependent pointer arm 118ª of the L-shaped bracket 118. The number of revolutions of the lens blank 77 can be increased or decreased, as required, by aligning one of the other numerals 124 with the pointer arm 118ª. Notwithstanding the stop-go operation of the lens blank 77 described supra, it has been found that more than one complete revolution of the lens blank 77 is required to obtain the desired fine grinding. With only one revolution of the lens blank 77, the same has a number of flat facets about its periphery which are satisfactorily removed for all spectacle uses with two more complete revolutions of the lens blank.

Means is provided for advancing the ratchet wheel 115 through that portion of a complete revolution corresponding to the spacing between adjacent numerals 124 of the series from one to five for each revolution of the lens blank 77. The ratchet wheel advancing means comprises an elongated stem 125 extended across the front of the machine and formed at its end adjacent the ratchet wheel 115 with a pawl 126.

For guiding longitudinal movements of the pawl carrying end of the stem 125 to insure engagement of the pawl 126 with the teeth of the ratchet wheel 115, the side of the base 31 is formed with a boss 127 into which a vertically extended screw 128 is threaded. The stem 125 is formed with an elongated slot 129 through which the screw 128 passes for guiding longitudinal movements of the stem 125.

The end of the stem 125 remote from the pawl 126 is pivotally connected by a pin 130, see Fig. 4, to one end of a lever 131 which is pivoted in intermediate of its ends on the bottom face of the cross bar 35 by means of a screw 132. The other end of the lever 131 is projected into the path traversed by a pin 133 eccentrically mounted on the bottom end of the shaft which mounts the gear worm 91 and the worm, not shown, which meshes with the gear worm 92. The relationship of the gearing which drives the lens blank 77 is such that each time the lens blank makes one complete revolution, the gear worm 91 and related parts including the pin 133 make one complete revolution. Thus, the lever 131 will be pivoted pushing on the stem 125 to turn the ratchet wheel in the direction of the arrow A through the desired portion of a complete revolution. A contraction spring 134, see Fig. 1, operates between the stem 125 and the respective bracket 32 urging the stem into a position in which the free end of the lever 131 will maintain contact with the eccentrically mounted pin 133.

Figure 8:
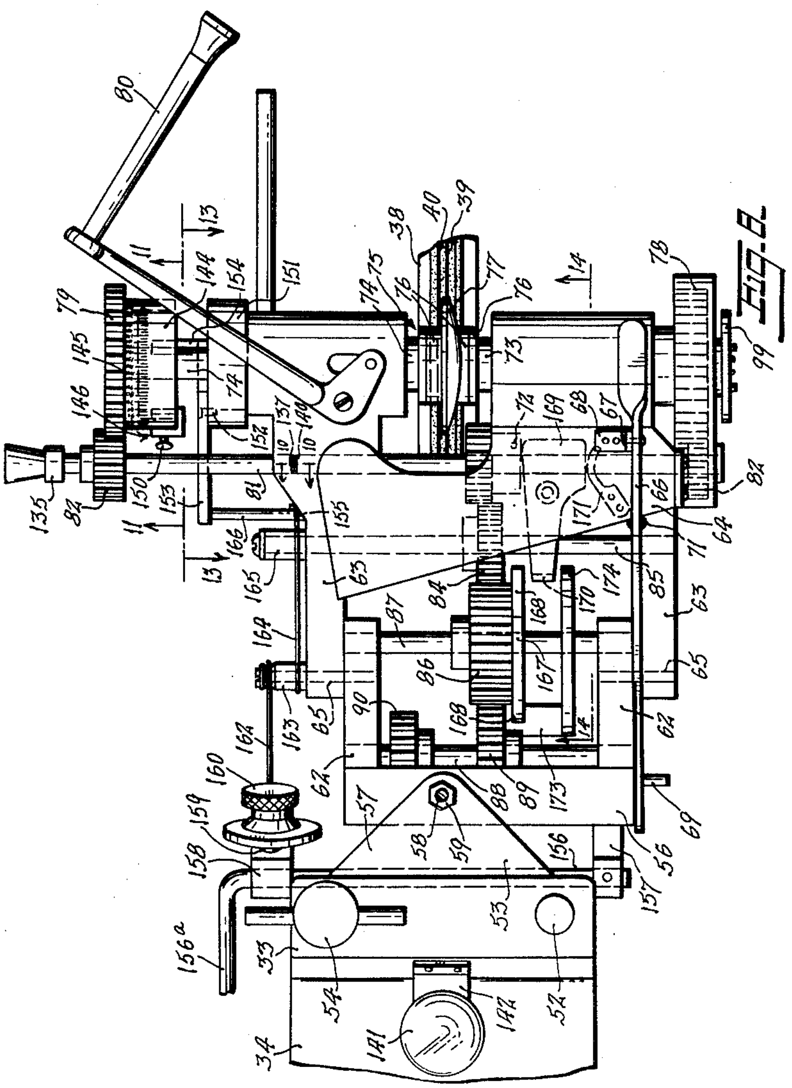
Fig. 8 is a plan view of Fig. 7.

Returning once again to the shaft 81 which mounts the gears 82 and 83 and which was previously described as being supported for axial sliding and rotative movements, that shaft is provided at its end adjacent the gear 79 with a radially extended handle 135. The handle 135 can be used for pulling the shaft 81 outward and for pushing it inward and for manually turning the shaft when pulled outward as will become clear in a moment. With the shaft 81 pushed inward as shown in Fig. 8, the gear 83 will be in mesh with the gear 84 which is the normal operating position of the shaft 81.

Means is provided for retaining the shaft 81 in its normal operating position with the gear 83 meshing with the gear 84 and is best illustrated in Fig. 10. That shaft retaining means comprises a passage 136 drilled in the frame section 64 and which is closed at its outer end by a threaded set screw 137. Positioned within the passage 136, there is a ball 138 which is urged toward the shaft 81 by an expansion spring 139 positioned within the passage 136 and operating between the adjacent faces of the ball 138 and the set screw 137. At one point, the shaft 81 is formed with a circumferential groove 140 into which the ball 138 engages for holding the shaft 81 in the pushed in position in which the gear 83 meshes with the gear 84.

On the other hand, when the shaft 81 is pulled outward, the ball 138 is snapped out of the groove 140 and the gear 83 moves out of mesh with the gear 84, the position shown in Fig. 9. Outward movement of the shaft 81 is arrested by engagement of the gear 82, which meshes with the gear 78, with the adjacent face of the frame section 64. At this point, it is essential to note that in each of the two positions of the shaft 81 shown in Figs. 8 and 9, the gears 82 carried by the shaft 81 always maintain engagement with the gears 78 and 79 of the shafts 73 and 74.

In the pulled out position of the shaft 81, shown in Fig. 9, the shaft 81 may be manually rotated using the handle 135. With the shaft 81 pulled out, it is possible to determine whether or not the lens blank 77 is properly centered with relation to the axis of the shafts 73 and 74 so as to be properly ground by the grinding wheel 38. That operation includes a lamp 141 supported upon the topmost cross bar 33 by means of a bracket 142 pinned to the cross bar 33.

The lamp 141, as will become clear as this specification proceeds, is connected in parallel with the lens motor 96 so that each time that motor is energized the lamp will be lit. Thus, when the lens blank 77 is clamped in position between the clamp heads 76, and the master switch 112 is closed, the frame section 64 can be lowered moving the lens blank 77 toward the periphery of the grinding wheel 38. With the shaft 81 pulled outward that shaft can be turned by hand using the handle 135, to turn the lens blank 77 relative to the grinding wheel 38. If the lens blank 77 is properly centered the lens blank 77 will contact the periphery of the grinding wheel 38 and hold the lens pattern 99 out of contact with the rest member 100 preventing the lever 103 from being pivoted to close the normally open switch 109 to energize the lens motor 96 and illuminate the lamp 141. However, if the lens blank 77 is not properly centered between the clamp heads 76, the one side of the lens blank will permit the lens pattern 99 to contact the rest member 100 before that side of the lens blank engages the grinding wheel 38, while the shaft 81 is being manually rotated. This contact of the lens pattern 99 with the rest member 100 will pivot the lever 103 and close the normally open switch 109 to illuminate the lamp 141 and energize the lens motor 96. Immediately, the operator will know that the frame section 64 will have to be raised and the position of the lens blank 77 adjusted to be concentric with the axis of the shafts 73 and 74. When adjustment of the lens blank is completed, the test is repeated until the lens blank can be turned through one complete revolution without illuminating the lamp 141. Improper centering of the lens blank 77 would of course be indicated by the energization of the lens motor 96; however, the lamp 141 provides a visual indicating means.

If the lens blank 77 is properly centered between the clamp heads 76 and assuming that the lens blank is considerably oversize as compared with the desired finished size of the lens, the handle 135 is then used to push the shaft 81 in for rough grinding of the lens blank 77 to within one or one and one-half millimeters of its finished size. To permit this to be done, the machine mounts a toggle switch 143 arranged as will become clear as this specification proceeds, to shunt the switch 109 so that when the toggle switch 143 is turned on the lens motor 96 will be energized regardless of the normally open position of the switch 109. To rough grind the lens blank 77, the position of the rest member 100 is elevated to about one or one and one-half millimeters greater than the finished size of the lens. The ratchet wheel 115 is then turned to close the normally open switch 112 and energize the grind stone motor 51. The toggle switch 143 is then pivoted to its on position to energize the lens motor 96 to continuously rotate the lens blank 77 with the shaft 81 pushed inward.

Grinding of the lens blank 77 will be continued until the lens pattern 99 rests down on the rest member 100 limiting further engagement of the lens blank with the grinding wheel 38. That stops further grinding contact of the lens blank with the grinding wheel 38 indicating that the lens blank has been rough ground to within the desired limits. The toggle switch 143 is then turned off and the frame section 64 manually lifted back to its starting position and the position of the rest member 100 adjusted for the final finishing grinding of the lens blank 77.

Turning now to the finish grinding of the lens blank 77 following proper centering and rough grinding of the lens blank, the position of the rest member 100 is first adjusted by turning the knob 104 in a direction to move the rest member 100 downward to the proper elevation. The ratchet wheel 115 is then turned in the direction of the arrow A on Fig. 6 to bring the proper numeral 124 into alignment with the dependent arm 118ª of the L-shaped bracket 118. Rotation of the ratchet wheel 115 causes the actuator rod 121 to be moved toward the master switch 112 closing the same to energize the grind stone motor 51 to continuously rotate the grinding stone 38. The lever 66 is then pivoted against the action of the spring 71 to free the frame section 64 to bring the rough ground lens blank 77 into contact with the grinding wheel 38. Since the lens blank 77 is larger than the lens pattern 99, the lens blank touches the grinding wheel 38 before the lens pattern touches the rest member 100. However, as the area of the lens blank 77 in contact with the grinding wheel becomes ground away, the lens pattern 99 will be lowered into contact with the rest member 100 and pivot the lever 103 to close the switch 109 and energize the lens motor 96 to turn the lens blank 77 through a portion of a revolution to bring another unground portion of the periphery of the lens blank into contact with the grinding wheel 38. This will again lift the lens pattern 99 out of contact with the rest member 100 and release the lever 103 to free the microswitch 109 to again assume its normally open position deenergizing the lens motor 96.

Figure 11:
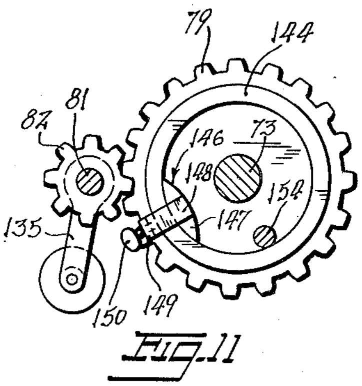
Fig. 11 is an enlarged partial vertical sectional view taken on the line 11—11 of Fig. 8.
Figure 12:
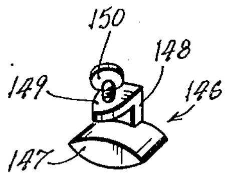
Fig. 12 is a perspective view of the control member, per se.

Means controlled by rotation of the lens holder is provided for pivoting the lens holder at certain predetermined times for engaging the lens blank 77 with the grinding surface 40 of the grinding wheel 38 to form the bevel on the back side of the lens blank. That lens holder pivoting means is designed to operate each time a straight edge of the lens blank 77 is turned into contact with the grinding wheel 38 so that the bevel will be formed on the back side of the lens at such straight edges. Thus, when a lens ground on the present machine is mounted in its supporting frame, the heavy beveled portions at the straight edges will be at the inner side of the frame hidden from view. The lens holder pivoting means is comprised of a cylindrical collar 144 formed on the inner face of the gear 79 concentric with the shaft 74. The periphery of the collar 144 is inscribed with a scale 145 designating the principal points of the meridian starting with "0" up to 180 over one-half the surface of the collar 144 and then back to "0" again over the other half of the collar 144, see particularly Fig. 21. Adjustably mounted on the collar 144, there is a control member 146 shown in perspective in Fig. 12. The control member 146 is U-shaped in configuration and comprises a cam portion 147 of substantially elliptical shape for engagement against the inner face of the collar 144, as best shown in Fig. 11. The cam portion 147 continues into an intermediate portion 148 which extends about the edge of the collar 144 and which in turn continues into a pointer portion 149 which extends over the outer face of the collar 144 to register with the scale 145. A thumb screw 150 is threaded through the pointer portion 149 to be tightened against the outer face of the collar 144 to hold the control member 146 in the desired adjusted position about the collar 144.

Mounted on the frame section 64 adjacent the collar 144, there is a band 151 which is fixed in position. Pivotally mounted on the band by means of a screw 152, see Fig. 13, there is a lever 153. Extending from the end of the lever 153 adjacent the band 151, there is a pin 154 which extends into the hollow of the cylindrical collar 144, see Fig. 11. A spring 155 operates between a pin 166 on the other end of the lever 153 and the frame section 64 to hold the lever in a pivoted position in which the pin 154 will engage the inner face of the cylindrical collar 144. Thus, it is apparent that each time the collar 144 makes a complete revolution, the cam portion 147 of the control member 146 will move past the pin 154 and cause the lever 153 to be pivoted against the action of the spring 155.

Extended across the carriage 53 beyond the adjacent end of the lens holder, there is a rocker shaft 156 which can be turned slightly relative to the carriage 53. At one end, the rocker shaft 156 has a right angular extension 156ª by which the rocker shaft can be pivoted by hand if desired. The extension may be suitably biased to press the lens blank 77 against the grinding surface of the grinding wheel 38. At the other end, there is fixedly secured to the rocker shaft 156, a depending shoe 157 which bears at its lower end against the frame section 56 so that when the rocker shaft 156 is turned in a counter-clockwise direction, as viewed in Fig. 15, the shoe 157 will cause the lens holder to be pivoted rearward moving the lens blank 77 out of contact with the grinding surface 39 and into contact with the grinding surface 40 of the grinding wheel 38.

Secured to the rocker shaft 156 adjacent its right angular extension 156ª, there is a fixed block 158 through the lower end of which an adjustment screw 159 is threaded. The screw 159 is provided at one end with an enlarged knurled knob 160 by which the screw 159 can be turned relative to the block 158. A lever 161 is pivoted on the block 158 between the rocker shaft 156 and the adjacent screw 159. The lever 161 has a free end depended below the block 158 and across the free end of the adjustment screw 159.

The side of the knob 160 facing away from the block 158 is provided with a calibrated scale 160ª, see Fig. 6, which registers with any suitable indicia mark carried by the block 158. The scale 160ª provides means for adjusting the position of the lever 161 relative to the block 158 to obtain the proper amount of placement bevel on the lens blank 77 when it is drawn over into grinding contact with the grinding surface 40 of the grinding wheel 38. The adjustment of the knob 160 thus adjusts the machine for proper grinding pressure of the lens blank 77 with the grinding surface 40.

A short length of flexible cable 162 is secured at one end to the bottom end of the lever 161 and has its other end secured to a small wheel 163. The wheel 163 is rotatively mounted on the projected end of the respective pivot pin 65 which pivotally joins the arms 62 and 63 of the frame sections 56 and 63. A second short length of flexible cable 164 is secured at one end of the wheel 163 and has its intermediate portion passed over a small drum 165 mounted on a projected end of the shaft 85. The other end of the second cable 164 is secured to the same end of the pin 166 to which the spring 155 is secured.

Thus, each time the lever 153 is pivoted by engagement of the pin 154 with the cam portion 147 of the control member 146, the cable 164 will be pulled turning the wheel 163. Turning of the wheel 163 in turn pulls the cable 162 drawing on the lever 161 and the block 158 causing the rocker shaft 156 to be turned. Turning of the shaft 156 causes the shoe 157 to bear against the frame section 56 and pivot the entire lens holder on the conical portions 60 of the screws 58. The straight edge of the lens blank 77 will move off the grinding surface 39 and into contact with the grinding surface 40 to form the bevel on the rear face of the lens blank. The adjustment screw 159 is provided for holding the lever 161 in the proper pivoted position with relation to the block 158 to engage the lens blank 77 with the grinding surface 40 with the proper grinding pressure, to obtain the proper bevel on the rear face of the lens. When the pin 154 rides off the cam portion 147 of the control member 146, the lever 153 is released to be drawn back to its starting position by the spring 155. The rocker shaft 156 is turned back to its starting position moving the shoe 157 back to free the lens holder to pivot back to its starting position reengaging the lens blank 77 with the grinding surface 39 of the grinding wheel 38. On the drawings, the cylindrical collar 144 is illustrated as having only one control member 146 which is so because the lens being ground has only one straight edge. In grinding lenses having more than one straight edge, the cylindrical collar 144 would be provided with a suitably located control member 146 for each of the straight edges.

Figure 14:
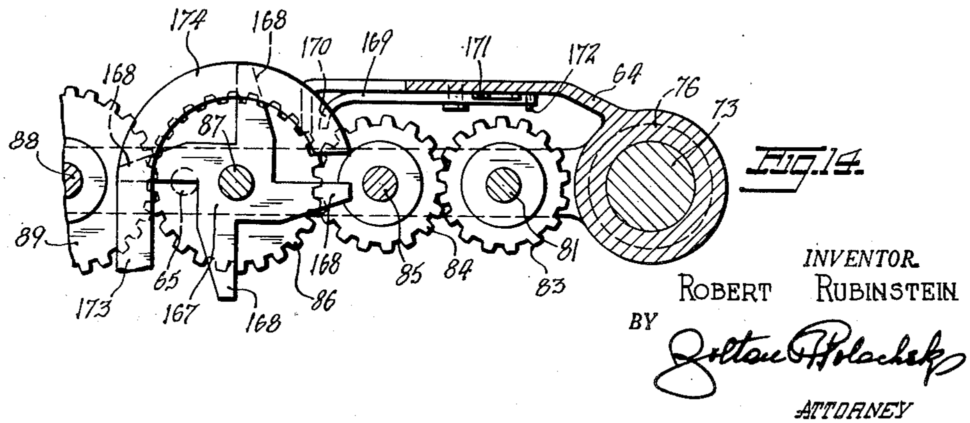
Fig. 14 is an enlarged partial vertical sectional view taken on the line 14—14 of Fig. 8.

Operation of the machine in the manner outlined is continued until the final grinding operation is nearly completed and the ratchet wheel 115 is moving from the "one" position back to its starting "zero" position. It being appreciated, of course, that the ratchet wheel 115 is advanced one numeral 124 by the stem 125 each time the lens blank 77 completes one revolution, as previously desired. During the time that the ratchet wheel 115 is moving from the "one" position to the "zero" position, mechanism is provided for pivoting the frame section 64 upward to move the finally ground lens blank 77 out of contact with relation of the grinding wheel 38. The mechanism for pivoting the frame section 64 to its raised position, includes a cam 167 secured to the shaft 87 along one side of the gear 86 so that the cam rotates with the shaft. Extending from the sides of the cam 167, as clearly shown in Fig. 14, there are four equally spaced arms 168 which extend radially from the shaft 87. Pivotally mounted on the frame section 64, there is a lifting pawl 169 which is provided at its end adjacent the cam 167 with a depending tail portion 170 depended to be engaged by the arms 168 of the cam 167 as it is rotated. However, the lifting pawl 169 is pivoted by a leaf spring 171 secured to the frame section 64 against a stop pin 172 to hold the tail portion 170 out of the path traversed by the arms 168 of the cam 167.

A rocker arm 173 is extended vertically and has its bottom end pivotally supported on the base 31 to move forward and rearward when pivoted. At its upper end, the rocker arm 173 is provided with a curved portion 174 arranged concentric with the arcuate path traversed by the tail portion 170 at the lifting pawl 169 when the frame section 64 is raised.

Pivotally attached at one end to the lower end of the rocker arm 173, see Fig. 1, there is an actuator arm 175. The free end portion of the actuator arm 175 is slidably supported by several lugs 176 to have its free end bear against a hub portion 177 formed on the inner face of the ratchet wheel 115 concentric with its shaft 116. An expansion spring 178, see Fig. 16, is engaged about the actuator arm 175 and operates between one of the lugs 176 and pin 179 extending from the side of the actuator arm 175. The spring 178 functions to hold the end of the actuator arm 175 in contact with the periphery of the hub portion 177 and maintain the rocker arm 173 in an inoperative pivoted position in which the lifting pawl 169 is out of alignment with the cam 167.

At a suitable location about its periphery, the hub portion 177 of the ratchet wheel 115 is formed with a notch 180 arranged to move into alignment with the free end of the actuator arm 175 as the ratchet wheel 115 is being turned from its "one" position to its "zero" position. When the notch 180 moves into alignment with the end of the actuator arm 175, the spring 178 moves the arm 175 to the right as viewed in Figs. 1 and 16, causing the rocker arm 173 to be pivoted engaging the curved top portion 174 against the tail portion 170 of the lifting pawl. That causes the lifting pawl 169 to be pivoted against the action of the leaf spring 171 moving the tail portion 170 into the path traversed by the arms 168 of the rotating cam 167. As one of the arms 168 engages the tail portion 170, the frame section 64 will be lifted to the position shown in Fig. 1. During the lifting of the frame section 64, the notches 70 of the lever 66 will ride over the pin 69 until the notch 70 closest the pivot pin 67 of the lever 66, engages the pin 69 to hold the frame section 64 in its elevated position.

Immediately, as the lens pattern 99 is lifted off the rest member 100, the lever 103 is pivoted freeing the microswitch 109 to assume its normally open position shutting off the supply of current to the lens motor 96.

Auxiliary switch means is provided for shunting the normally open microswitch 109 and the switch 143 to maintain energization of the lens motor 96 a sufficient length of time following completion of the grinding operation to permit lifting of the frame section 64 to be completed and completing the turning of the ratchet wheel 115 back to its starting "zero" position. As the "zero" position is reached, the notch 180 moves clear of the end of the actuator arm 175 so that the hub portion 177 will function to restore the actuator arm 175 to its starting position against the action of the spring 178. At the same time, the recess 123 moves back into alignment with the ball 122 on the end of the actuator rod 121 relieving the pressure on that rod so that the master microswitch 112 may again assume its normally open position shutting off the supply of current to both motors 51 and 96.

The auxiliary switch means comprises a microswitch 181, see Figs. 1 and 16, mounted on the base 31 above an intermediate portion of the actuator arm 175. The microswitch 181 is a normally closed one for passing electric current to the lens motor 96 and has the usual actuator 182 and fixedly mounted leaf spring 183 which has its free end position to engage the actuator 182 to press inward thereon and hold the switch closed. Mounted on the actuator arm 175, there is a small roller 184, which in the normal position of the actuator arm 175, in which its free end engages the periphery of the hub 177, engages the leaf spring 183 flexing the same to press in on the actuator 182 to hold the microswitch 181 in an open position.

On the other hand, when the free end of the actuator arm 175 is snapped by the spring 178 into the notch 180, the roller 184 rides off the leaf spring 183 freeing the leaf spring so that the microswitch 181 can snap to its normally closed position maintaining energization of the lens motor 96 notwithstanding that the lens pattern 99 has been lifted off the rest member 100. During the time that the roller 184 is out of engagement with the leaf spring 183, the lens motor 96 will continue to operate to restore the machine completely to its starting position. The added time required for this restoration to the starting position accounts for the greater space between "zero" and "one" on the ratchet wheel 115 as compared with the spacing of the other numerals 124 on that wheel.

Referring now to Fig. 22, there is schematically illustrated the wiring circuits of the machine. The usual plug 185 is provided for insertion into a receptacle supplying 110 volt current from which leads 186 and 187 extend to a terminal box 188 mounted on the pedestal 30, see Figs. 2 and 3. Extending from one side of the terminal box 188, is a lead 189 to one side of the master microswitch 112 and from the other side there extends a lead 190 to one side of the grind stone motor 51. A lead 191 from the other side of the grind stone motor 51 is connected to the other side of the terminal box 188. Thus, when the normally open master switch 112 is closed, the grind stone motor 51 will be energized to continuously rotate the grind stone motor 51.

A lead 192 is connected at one end to the lead 190 between the master switch 112 and the motor 51 and is connected at its other end to the lens motor 96. A lead 193 extends from the other side of the lens motor 96 to one side of the microswitch 109. A lead 194 extends from the other side of the microswitch 109 and has its other end connected to the lead 191 between the grind stone motor 51 and the terminal box 188. Thus, when both the switches 112 and 109 are closed, the lens motor 96 will be energized. The leads 195 and 196 from the indicator lamp 141 are connected to the leads 192 and 193 on opposite sides of the lens motor 96. Thus, the lamp is connected in parallel with the lens motor 96 to be illuminated when the motor is energized.

A lead 197 from the lead 193 is connected to one side of the microswitch 181 and a second lead 198 from the other side of the microswitch 181 is connected to the lead 194. Likewise, a lead 199 from the lead 193 is connected to one side of the toggle switch 143 and a second lead 200 from the other side of the toggle switch 143 is connected to the lead 194. The switches 109, 143, and 181 are connected in parallel with each other; but each switch is in a series with the lens motor 96 so that any one of the switches shunts the other two with the result that the closing of the switch 109, 143 or 181 will cause the lens motor 96 to be energized regardless of whether the other two switches are in a closed position. However, it is appreciated that before any one of the motors can be energized, the master switch 112 must be closed.

Means is provided for cooling the grinding wheel 38 during operation of the lens edge beveling machine. The cooling means comprises a container 201 for water provided at its bottom end with a downwardly opening socket 202 which is fitted over the top of a peg, not shown, carried by one end of a bracket 203 secured at its other end to the top face of the cross bar of the machine by a bolt 204. A thumb screw 205 is threaded through the side of the socket 202 to be tightened against the peg of the bracket 203 for holding the container 201 in the desired rotative position on the peg. Extending from the side of the container 201, there is a discharge pipe 206 through which the water from the container is to flow by gravity. The rate of flow of the water from the container 201 is controlled by a stop cock 207 mounted in the discharge pipe 206. As the water drops from the end of the pipe 206, it falls into a funnel-shaped member 208 mounted on the top end of a rigid tube 209 mounted on a housing 210. The housing 210 is rigidly mounted on the body of the machine over a portion of the grinding wheel 38, see particularly Fig. 2. Positioned within the housing 210 to bear against the periphery of the grinding wheel 38, there is a sponge 211. The tube 209 is mounted to discharge its water into the sponge 211 to saturate the same and keep the grinding surfaces of the grinding wheel 38 wet cooling the same.

Figure 17:
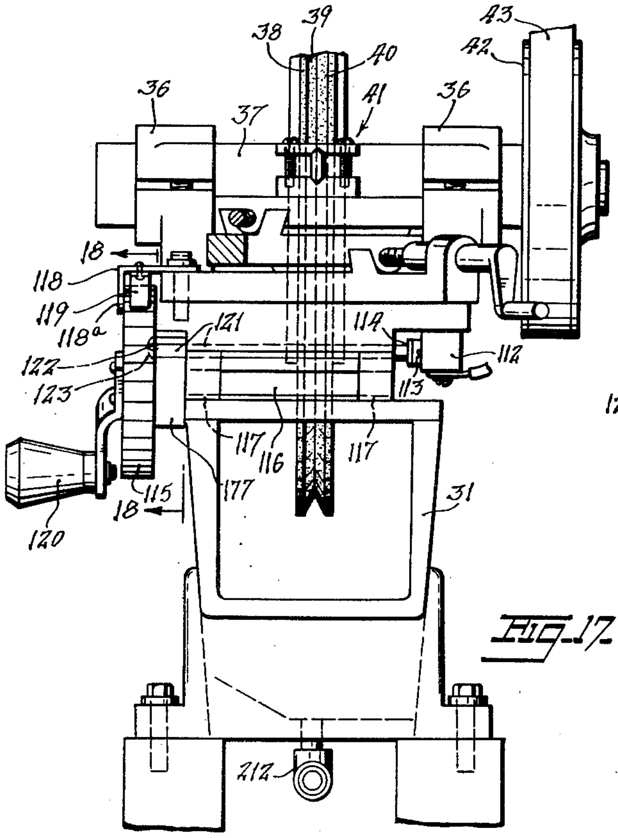
Fig. 17 is a view looking in the direction of the line 17—17 of Fig. 16.

The base 31, beneath the grinding wheel 38, is hollow, as best shown in Fig. 17, to collect the water as it drips from the grinding wheel 38. The bottom of the hollow base 31 is pitched to a low point from which a pipe 212 extends. The pipe 212 can be provided with any known means for conveying the consumed water to a suitable collection container or sewerage disposal pipe, not shown.

It is believed that the entire operation of the machine to finish the grinding of a lens to be mounted in a spectacle frame will be clearly apparent from the foregoing description and that a detailed description of the operation is not necessary. It is now apparent that the present invention provides a machine which is unique in its operation for automatically carrying out the finished grinding of a lens blank regardless of the number of straight edges in such a manner that the heavy bevel at the straight edges will be at the rear of such a lens. Mounting the lens in the spectacle frame will cause the heavy bevel to be located at the rear side of the frame where it will not be noticed. The machine is particularly characterized by its simplicity of set-up and operation making it possible for unskilled help to satisfactorily grind lenses to the desired finished shape to greatly reduce the cost of producing such lenses.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens, supported in said lens holder with the other grinding face of the grinding wheel.

2. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder comprising a motor.

3. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder comprising a motor, and a gear train interposed between said latter motor and said lens holder.

4. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder comprising a motor, and a gear train interposed between said latter motor and said lens holder, said gear train including one gear mounted on an axially slidably mounted shaft, and means for holding said shaft in an axially shifted position in which the said one gear is in mesh with the other gears of the gear train.

5. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder comprising a motor, and a gear train interposed between said latter motor and said lens holder, said gear train including one gear mounted on an axially slidably mounted shaft, and means for holding said shaft in an axially shifted position in which the said one gear is in mesh with the other gears of the gear train, and a handle mounted on the end of said axially movable shaft by which it can be manually shifted axially against the holding action of said holding means to move the said one gear out of mesh with its driving gear of said gear train so that the lens holder can be turned by hand using said handle.

6. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said latter means comprising a cylindrical collar mounted to rotate concentrically with said lens holder, a pivotally mounted lever, a pin on one end of said lever extended into said collar, a control member adjustably mounted on said collar to engage said pin and to pivot said lever on each revolution of said collar, and means connected to said lever for pivoting said lens holder each time said lever is pivoted.

7. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said latter means comprising a cylindrical collar mounted to rotate concentrically with said lens holder, a pivotally mounted lever, a pin on one end of said lever extended into said collar, a control member adjustably mounted on said collar to engage said pin and pivot said lever on each revolution of said collar, and means connected to said lever for pivoting said lens holder each time said lever is pivoted, said control member comprising a cam portion positioned within said collar, an intermediate portion continuing from said cam portion and extended about the edge of said collar, and a pointer portion extended from said intermediate portion along the outer periphery of said collar.

8. In a lens edge beveling machine having a rotary grinding wheel with opposed grinding faces, a support for said wheel, a motor for rotating the grinding wheel, and a support for said motor, a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said latter means comprising a cylindrical collar mounted to rotate concentrically with said lens holder, a pivotally mounted lever, a pin on one end of said lever extended into said collar, a control member adjustably mounted on said collar to engage said pin and pivot said lever on each revolution of said collar, and means connected to said lever for pivoting said lens holder each time said lever is pivoted, said control member comprising a cam portion positioned within said collar, an intermediate portion continuing from said cam portion and extended about the edge of said collar, and a pointer portion extended from said intermediate portion along the outer periphery of said collar, and a clamp screw threaded through said pointed portion and against the outer periphery of said collar securing said control member in the desired fixed position on said collar.

9. In a lens edge beveling machine having a rotary grinding wheel with opposed grinding faces, a support for said wheel, a motor for rotating the grinding wheel, and a support for said motor, a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said latter means comprising a cylindrical collar mounted to rotate concentrically with said lens holder, a pivotally mounted lever, a pin on one end of said lever extended into said collar, a control member adjustably mounted on said collar to engage said pin and pivot said lever on each revolution of said collar, and means connected to said lever for pivoting said lens holder each time said lever is pivoted, said control member comprising a cam portion positioned within said collar, an intermediate portion continuing from said cam portion and extended about the edge of said collar, and a pointer portion extended from said intermediate portion along the outer periphery of said collar, and a scale on the outer periphery of said collar in alignment with said pointer portion.

10. In a lens edge beveling machine having a rotary grinding wheel with opposed grinding faces, a support for said wheel, a motor for rotating the grinding wheel, and a support for said motor, a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said latter means comprising a cylindrical collar mounted to rotate concentrically with said lens holder, a pivotally mounted lever, a pin on one end of said lever extended into said collar, a control member adjustably mounted on said collar to engage said pin and pivot said lever on each revolution of said collar, and means connected to said lever for pivoting said lens holder each time said lever is pivoted, said pivoting means comprising a rocker shaft turnably mounted on a fixed part of the machine adjacent the pivot axis of the lens holder, a shoe mounted on one end of said shaft and engaging said lens holder on one side of its pivot axis, a lever mounted on the other end of said shaft, and cable means connecting said lever of said rocker shaft with said first-mentioned lever.

11. In a lens edge beveling machine having a rotary grinding wheel with opposed grinding faces, a support for said wheel, a motor for rotating the grinding wheel, and a support for said motor, a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said latter means comprising a cylindrical collar mounted to rotate concentrically with said lens holder, a pivotally mounted lever, a pin on one end of said lever extended into said collar, a control member adjustably mounted on said collar to engage said pin and pivot said lever on each revolution of said collar, and means connected to said lever for pivoting said lens holder each time said lever is pivoted, said pivoting means comprising a rocker shaft turnably mounted on a fixed part of the machine adjacent the pivot axis of the lens holder, a shoe mounted on one end of said shaft and engaging said lens holder on one side of its pivot axis, a lever mounted on the other end of said shaft, and cable means connecting said lever of said rocker shaft with said first-mentioned lever, said lever of said rocker shaft being pivotally mounted on a block fixedly mounted on the said other end of said rocker shaft, and means for holding the said lever in a desired pivoted position relative to said block for controlling the amount of bevel formed on said lens when said lens holder is pivoted.

12. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said latter means comprising a cylindrical collar mounted to rotate concentrically with said lens holder; a pivotally mounted lever, a pin on one end of said lever extended into said collar, a control member adjustably mounted on said collar to engage said pin and pivot said lever on each revolution of said collar, and means connected to said lever for pivoting said lens holder each time said lever is pivoted, said pivoting means comprising a rocker shaft turnably mounted on a fixed part of the machine adjacent the pivot axis of the lens holder, a shoe mounted on one end of said shaft and engaging said lens holder on one side of its pivot axis, a lever mounted on the other end of said shaft, and cable means connecting said lever of said rocker shaft with said first-mentioned lever, said lever of said rocker shaft being pivotally mounted on a block fixedly mounted on the said other end of said rocker shaft, and means for holding the said lever in a desired pivoted position relative to said block for controlling the amount of bevel formed on said lens when said lens holder is pivoted, said holding means comprising an adjustment screw threaded through said block and engaged with the lever pivoted on said block, an enlarged knurled knob mounted on said screw by which it can be turned, and a scale on said knob registering with an indicia on said block.

13. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder including a motor, and an electric circuit including a master microswitch for controlling the supply of electric current to each of said motors, and manually operable means including a manually rotative ratchet wheel for closing said master switch to supply the current required to energize said motors.

14. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens suported in said lens holder with the other grinding face of the grinding wheel, said means for rotating said lens holder including a motor, and an electric circuit including a master micro-switch for controlling the supply of electric current to each of said motors, and manually operable means including a manually rotative ratchet wheel for closing said master switch to supply the current required to energize said motors, and stop-go means for energizing the lens motor including a normally open microswitch, a pivotally mounted lever for engaging said microswitch, and lens pattern carried by said lens holder for engaging and pivoting said lever as the area of the lens in engagement with the grind wheel is ground away lowering said lens pattern onto said lens holder.

15. In a lens edge beveling machine having a rotary grinding wheel with opposed grinding faces, a support for said wheel, a motor for rotating the grinding wheel, and a support for said motor a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder comprising a motor, and an electric circuit including a master microswitch for controlling the supply of electric current to each of said motors, and manually operable means including a manually rotative ratchet wheel for closing said master switch to supply the current required to energize said motors, and stop-go means for energizing the lens motor including a normally open microswitch, a pivotally mounted lever for engaging said microswitch, and lens pattern carried by said lens holder for engaging and pivoting said lever as the area of the lens in engagement with the grind wheel is ground away lowering said lens pattern onto said lens holder, and means controlled by said ratchet wheel for causing said master microswitch to be re-opened after a predetermined number of revolutions of said lens relative to said grinding wheel.

16. In a lens edge beveling machine having a rotary grinding wheel with opposed grinding faces, a support for said wheel, a motor for rotating the grinding wheel, and a support for said motor, a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder including a motor, and an electric circuit including a master microswitch for controlling the supply of electric current to each of said motors, and manually operable means including a manually rotative ratchet wheel for closing said master switch to supply the current required to energize said motors, and stop-go means for energizing the lens motor including a normally open microswitch, a pivotally mounted lever for engaging said microswitch, and a lens pattern carried by said lens holder for engaging and pivoting said lever as the area of the lens in engagement with the grind wheel is ground away lowering said lens pattern onto said lens holder, and means controlled by said ratchet wheel for causing said master microswitch to be re-opened after a predetermined number of revolutions of said lens relative to said grinding wheel, and means controlled by said ratchet wheel for raising said lens off the grinding wheel upon completion of said grinding operation and prior to reopening of said latter master switch.

17. In a lens edge beveling machine having a rotary grinding wheel with opposed grinding faces, a support for said wheel, a motor for rotating the grinding wheel, and a support for said motor, a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder including a motor, and an electric circuit including a master microswitch for controlling the supply of electric current to each of said motors, and manually operable means including a manually rotative ratchet wheel for closing said master switch to supply the current required to energize said motors, and stop-go means for energizing the lens motor including a normally open microswitch, a pivotally mounted lever for engaging said microswitch, and lens pattern carried by said lens holder for engaging and pivoting said lever as the area of the lens in engagement with the grind wheel is ground away lowering said lens pattern onto said lens holder, and means controlled by said ratchet wheel for causing said master microswitch to be re-opened after a predetermined number of revolutions of said lens relative to said grinding wheel, and means controlled by said ratchet wheel for raising said lens off the grinding wheel upon completion of said grinding operation and prior to re-opening of said latter master switch, said latter means including a normally closed microswitch in series with said lens motor and shunting said normally open microswitch, and means holding said normally closed microswitch open.

18. In a lens edge beveling machine having a rotary grinding wheel with opposed grinding faces, a support for said wheel, a motor for rotating the grinding wheel, and a support for said motor, a rotary lens holder for supporting a lens in grinding relation to the grinding wheel, means for rotating said lens holder, means for pivotally supporting said lens holder on an axis extended at right angles to the axis of rotation of said lens holder to assure a position in which the lens supported in said lens holder will be engaged with one of the grinding faces of the grinding wheel, and means operatively coupled to said lens holder and actuated by rotation thereof for pivoting said lens holder at certain predetermined times for engaging the lens supported in said lens holder with the other grinding face of the grinding wheel, said means for rotating said lens holder comprising a motor, and an electric circuit including a master microswitch for controlling the supply of electric current to each of said motors, and manually operable means including a manually rotative ratchet wheel for closing said master switch to supply the current required to energize said motors, and stop-go means for energizing the lens motor including a normally open microswitch, a pivotally mounted lever for engaging said microswitch, and a lens pattern carried by said lens holder for engaging and pivoting said lever as the area of the lens in engagement with the grind wheel is ground away lowering said lens pattern onto said lens holder, and means controlled by said ratchet wheel for causing said master microswitch to be re-opened after a predetermined number of revolutions of said lens relative to said grinding wheel, and means controlled by said ratchet wheel for raising said lens off the grinding wheel upon completion of said grinding operation and prior to re-opening of said latter master switch said latter means including a normally closed microswitch in series with said lens motor and shunting said normally open microswitch, and means holding said normally closed microswitch open, and a manually operable toggle switch connected in series with said lens motor and shunting said normally closed microswitch and said normally open microswitch to turn said lens motor on.

ROBERT RUBINSTEIN.

References Cited in the file of this patent

UNITED STATES PATENTS

| Number | Name | Date |
|---|---|---|
| 1,226,329 | Hansen | May 15, 1917 |
| 1,365,448 | Birchall | Jan. 11, 1921 |
| 1,521,116 | Miller | Dec. 30, 1924 |
| 1,527,594 | Long | Feb. 24, 1925 |
| 1,657,720 | Long | Jan. 31, 1928 |
| 2,164,155 | Lemay | June 27, 1939 |
| 2,321,383 | Harper | June 8, 1943 |
| 2,414,126 | Sevin | Jan. 14, 1947 |
| 2,528,137 | Grasser | Oct. 31, 1950 |

FOREIGN PATENTS

| Number | Country | Date |
|---|---|---|
| 512,104 | Great Britain | Aug. 29, 1939 |
| 937,109 | France | Mar. 1, 1948 |